Oct. 2, 1951     S. C. HOARE ET AL     2,570,125
INTERLOCKING SIGNALING SYSTEM FOR ELECTRICAL
INDICATING INSTRUMENTS
Filed Nov. 26, 1949
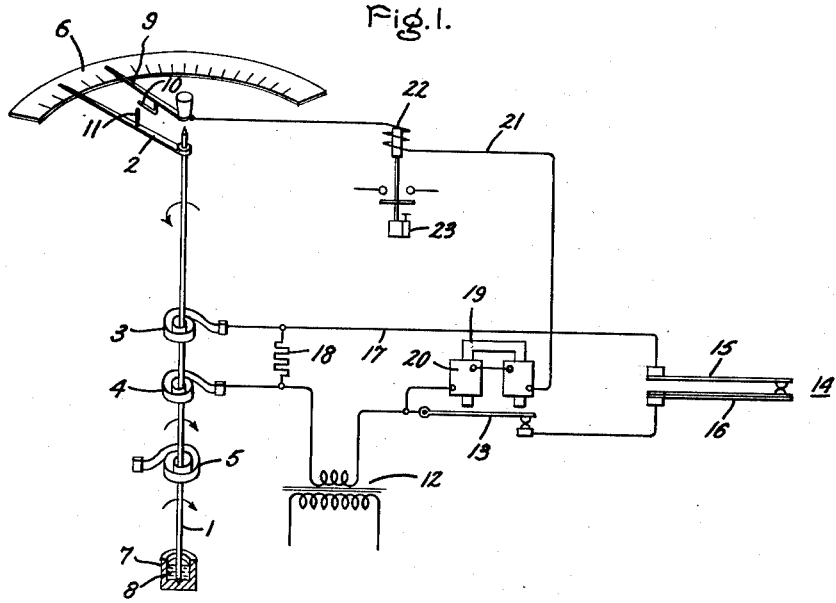
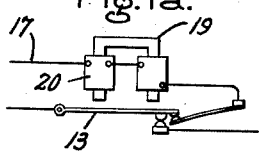
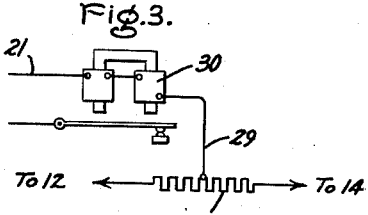
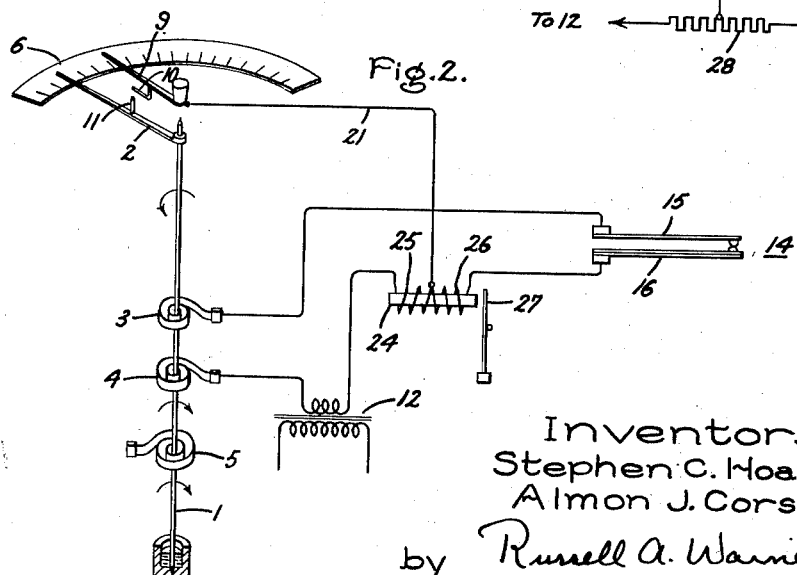
Inventors:
Stephen C. Hoare,
Almon J. Corson,
by Russell A. Warner
Their Attorney.

Patented Oct. 2, 1951

2,570,125

UNITED STATES PATENT OFFICE 2,570,125

INTERLOCKING SIGNALING SYSTEM FOR ELECTRICAL INDICATING INSTRUMENTS

Stephen C. Hoare, Manchester, and Almon J. Corson, Marblehead, Mass., assignors to General Electric Company, a corporation of New York Application November 26, 1949, Serial No. 129,674

7 Claims. (Cl. 177—311)

Our invention relates to an electric signaling system for use with electrical indicating instruments for the purpose of establishing a signaling circuit when a predetermined instrument deflection occurs, and its object is to so combine the signaling circuit with the energizing circuit of the instrument that when the signaling circuit is established, the electric energy supplied to the instrument is modified in such a way as to assure that the signaling circuit will remain closed until the apparatus is manually reset.

In a preferred form of our invention the instrument indicating pointer, forming one contact, is arranged to engage a relatively stationary contact to establish the signaling circuit. The relatively stationary contact is adjustable so that contact may be made to occur at any predetermined selected deflection of the instrument. When such contact is made, the signaling circuit is established and also the electrical energy supply to the instrument is modified, and the instrument torque is modified in a direction to increase the signaling contact pressure. Thus an electrical interlock is established which maintains the signaling circuit closed until the apparatus is manually reset.

The features of our invention which are believed to be novel and patentable will be pointed out in the claims appended hereto. For a better understanding of our invention, reference is made in the following description to the accompanying drawing in which Fig. 1 represents a preferred embodiment of our invention as applied to a thermal responsive type of temperature measuring apparatus. Fig. 1a illustrates a connection to adapt the apparatus of Fig. 1 for direct current operation. Fig. 2 is a modification of Fig. 1 in which a differential transformer replaces an electromagnet relay used in Fig. 1. Fig. 3 illustrates a resistance that may be used in place of the electromagnet relay of Fig. 1 or the differential transformer of Fig. 2.

Referring now to Fig. 1, I represents the metal shaft and 2 the metal indicating pointer of a thermal type of electrical measuring instrument. The inner ends of three spiral springs 3, 4, and 5 are secured to the shaft and their outer ends are fixed to stationary supports. The upper spiral 3 is bimetallic and when heated produces a torque on the shaft in a counterclockwise direction. Spiral 3 is included in an electric measuring circuit to be described and is heated by current passing therethrough. Spiral 5 is likewise a bimetal spiral and when heated produces a clockwise torque on the shaft. It is not included in any electric circuit and serves only to compensate the instrument for changes in ambient temperature. Spiral 4 is a metallic spiral that is not influenced by temperature changes and serves only to conduct current to and from spiral 3 through the shaft I of the instrument. Spiral 4 is selected to have a minimum torque consistent with rigidity and current carrying capacity. When spirals 3 and 5 are at the same temperature, the pointer 2 is at the right-hand end of its scale represented at 6. The lower bearing for shaft I is contained in a cup in which there is contained a quantity of damping liquid 8, preferably silicone oil, which has nearly constant viscosity and damping properties at all expected temperatures. Pivoted in line with the shaft is an adjustable pointer 9 of metal carrying a contact 10. The pointer 2 of the instrument also carries a contact 11. The contact 10 lies in the path of movement of contact 11 and when opposite each other they establish a signaling circuit to be described. The relatively stationary contact 10 with its pointer may be adjusted to any desired point along the scale and, in the modifications described, always lies to the right of or in the clockwise direction with respect to pointer 2.

The electrical measuring circuit is energized by low voltage alternating current from the secondary of a transformer 12, and includes normally closed contacts of a switch 13, and a temperature responsive detector of the contact making and breaking type represented at 14. The detector comprises a switch having a stationary contactor 15 and a movable contactor 16. The latter is of bimetal and when heated bends away from contactor 15 and opens the switch contacts.

The detector 14 is placed in the region at which it is desired to measure the temperature. It is therefore subject to such measurement temperature and also to heating by current passing through the bimetal contactor 16 when the contacts are closed. The contacts of this detector are adjusted to be just lightly closed when the detector is at the highest temperature to be measured. This of course heats the bimetal 16 to a higher temperature and the contacts open. The device then cools and the action is repeated. At lower measurement temperatures the bimetal contactor 16 cools more quickly so that the time duration between contacting operations decreases and the average current flowing through the contact per unit of time increases. The bimetal contactor 16 must be capable of opening the circuit at the lowest temperature to be measured.

In some instances the current may pass through a heating resistance wrapped about the bimetal 16. The operation of this form of temperature detector is to pass an average quantity of current which is inversely proportional to the temperature to be measured, and this is independent of normal voltage variations in the source of supply. Under normal conditions the current thus flowing through detector 14 passes through the instrument spirals 3 and 4 through the circuit shown, including closed contacts at 13 and the wire 17. To better proportion the instrument and detector currents, we have found it desirable to use a resistance shunt 18 across the instrument to by-pass some of the current. The currents through the instrument and shunt are proportional and inversely proportional to the temperature to be measured.

It will now be seen that at a low measurement temperature and a high average current through the measuring circuit, pointer 2 will be deflected towards the left end of scale 6 and at high measurement temperatures and low average current, towards the right end of the scale. The scale is calibrated with the apparatus so that the instrument indicates the temperature to which the detector 14 is exposed.

Our signaling contact and interlock features utilize a vibrator relay having a magnetic core 19 and winding 20 which when energized attracts the magnetic vibrator arm and switch contactor 13 contained in the measurement circuit. The winding 20 of the vibrator relay is energized from the secondary of transformer 12 through a wire 21, contacts 10 and 11 (when closed), shaft 1, and return spring spiral 4. The signaling features are used as follows: After the measuring system is in operation and the pointer 2 is deflected towards the left in response to the operation of detector 14 and the temperature existing thereat, the adjustable contact pointer 9 is adjusted to the right of pointer 2 to that temperature indicated on scale 6 at which it is desired that a signal be given. For example, the detector 14 may be located in an oven and the signal used to give an indication when the oven temperature increases to a given value. As the temperature increases, pointer 2 deflects to the right towards pointer 9 and at the temperature for which pointer 9 has been set, contact 11 will close against contact 10 and establish a circuit through vibrator relay winding 20. This will attract armature 13 and open the measurement circuit. Since the relay is energized by alternating current, the armature 13 will vibrate and produce an audible alarm, with the contactor 13 in an open circuit condition for a considerable portion of the vibrating time cycle. This greatly reduces any current which the detector 14 attempts to transmit to the measuring instrument through wire 17 and bimetal spiral 3. As a consequence, an alarm is sounded and the torque of spiral 3 decreased, which results in pointer 2 attempting to deflect further in a clockwise direction and thus firmly holding the contacts 11 and 10 closed.

The vibrator relay can be designed to vibrate and accomplish practically an open circuit condition of its contactor, such that even though the contact pointer 9 be set for a high measurement temperature near the right end of scale 6 where the average measurement current through spiral 3 is normally at a low average value, the interlock will be effective.

To reset the apparatus so as to stop the buzzer operation and return the apparatus to a temperature measuring condition, the pointer 9 is moved manually to the right end of scale 6 or further, if necessary, so as to open the vibrator circuit between contacts 10 and 11. As soon as this is done, the temperature measuring function of the measurement apparatus is restored and the pointer 2 returns to the correct temperature indicating position.

If the apparatus is to be used with a direct current source of supply, the vibrator relay would be connected to open its own circuit in the attracted position and close it again as its armature 13 approaches detracted position as shown, for example, in Fig. 1a. The apparatus will operate satisfactorily on either A.-C. or D.-C. In fact, it will work satisfactorily when the alarm circuit is energized with A.-C. or D.-C. and the measurement circuit is energized with D.-C. or A.-C. A control relay 22 may be included in the buzzer circuit, if desired. The relay 22 is represented as of a type which will pull in and close its contacts and hold them closed so long as the buzzer circuit remains energized with either A.-C. or D.-C., since it is provided with a dashpot represented at 23 that prevents opening of the relay contacts between pulses of current in the buzzer circuit. A shading coil on the core would also be effective in producing the necessary delay action.

The damper comprising parts 1, 7, and 8 is desirable to assist in reducing fluctuations of the pointer 2 that may be caused by the pulsating nature of the instrument energizing current.

In Fig. 2 we have shown another form of buzzer relay that may be used on alternating current systems. The relay consists of a magnetic core 24 on which is wound similar but opposing coils 25 and 26. These coils are in series with the measurement circuit and since they are in opposition, the measurement current alone produces no flux in the core and hence the buzzer armature 27 is not vibrated under this condition. Line 21 to the instrument contacts 10 and 11 is connected between the coils 25 and 26 and hence when these contacts close, the relay device acts as an autotransformer to greatly reduce the voltage that is available to send current through the detector 14, and hence, although the measurement circuit is not opened by the buzzer relay, the current in the measurement circuit is greatly reduced when the relay is energized, and thus the contact interlocking feature is retained. Also, when the contacts 10 and 11 are closed, a substantial alternating flux is produced in core 24, and so the magnetic armature 27 vibrates and gives an audible indication. Thus the buzzer relay of Fig. 2 has a differential action when traversed by measurement current only, and an autotransformer and buzzer action when energized from the control contacts. Some reduction of current flow in the measurement circuit is due to the impedance drop through the winding of the buzzer when it is acting as an autotransformer, but the major effect is due to the bucking autotransformer action.

In Fig. 3 still another arrangement to replace the buzzer relays of Figs. 1 and 2 is represented. Here a resistance 28 is included in the measurement circuit between the transformer and detector, and the resistance is tapped at an intermediate point 29 and a vibrator relay 30 connected between this point and line 17 leading to the instrument contacts. The connection will otherwise be the same as previously described.

When the instrument contacts are closed, the increased drop in the resistance to the left of tap 29 reduces the current in the measurement circuit and results in the interlocking action of the contacts 10 and 11. This arrangement is not as effective in reducing measurement current flow as those previously described. The armature of the vibrator of Fig. 3 produces an audible alarm when the coil 30 is energized with alternating current.

It will be evident to those skilled in the art that the modification of the current in the measurement circuit upon the closure of the control contacts may be accomplished in various ways, as, for example, by shunting the instrument.

What we claim as new and desire to secure by Letters Patent of the United States is:

1. An electrical measuring instrument including a pointer which is deflected to indicate the measurement produced, a contact carried by said pointer, a second contact adjustable along and in the path of movement of the pointer carried contact, a measurement energizing circuit for said instrument, an alarm circuit which is operatively energized and deenergized only by the closing and opening of said contacts, and electrical means in said alarm circuit which when energized through the closure of said contacts modifies the current flowing in said instrument measuring circuit in a direction to increase such contact pressure and serving through the resulting change in energization of said instrument as an electrical interlock to maintain said contacts closed.

2. An electrical measuring instrument, a measurement circuit for energizing said instrument, said instrument having a pointer which is deflected in accordance with variations in the energizing current of said instrument and the resulting measurement produced, a contact carried by said pointer, a second contact adjustable along and in the path of movement of the pointer contact, an alarm circuit which is operatively energized and deenergized only by the closure and opening of said contacts, and electric control means in said alarm circuit which when energized modifies the current flowing in the instrument measuring circuit, said second contact being positioned on that side of the pointer contact towards which the pointer will be deflected in response to the modification in instrument current produced when said control means is energized, whereby when said contacts are closed in response to a measurement deflection of said instrument they will remain closed by reason of an increased instrument deflection response in the same direction.

3. An electrical measuring instrument, a measuring circuit for energizing said instrument, said instrument having a pointer which is deflected in accordance with variations in the energizing current of said instrument and the resulting measurement produced, a contact carried by said pointer, a second contact adjustable along and in the path of movement of the pointer contact and positioned in the upscale deflection side of said pointer contact, an alarm circuit which is operatively energized and deenergized only by the closure and opening of said contacts, a combined electric control means and audible alarm in said alarm circuit which when energized sounds said alarm and modifies the current flowing in the instrument measuring circuit, said current modification in the instrument energizing circuit being such as to produce an upscale deflection response of said instrument whereby when said contacts are closed in response to an upscale measurement deflection of said instrument they will remain closed by reason of the increased upscale deflection response of said instrument occasioned by the energization of said control device and the modification of the instrument energizing current thereby.

4. An electrical measuring instrument, a measurement circuit for energizing said instrument, a pointer for said instrument which is deflected in accordance with variation in the energizing current of said instrument, a contact carried by said pointer, a second contact adjustable along and in the path of movement of said pointer contact, said second contact being located on that side of the pointer contact towards which the pointer deflects in response to a reduction in instrument current, an electrically operated regulator for controlling the current in the instrument energizing circuit, and an operating circuit for said regulator which is operatively energized and deenergized only by the closing and opening of said contacts, said regulator when energized causing a substantial reduction in the energizing current of said instrument.

5. An electric measuring instrument of the thermal deflection type, a measuring circuit for supplying heating current to said instrument in accordance with a quantity to be measured by said instrument, a normally inactive electrically operated regulator which when energized produces a substantial reduction in the average heating current normally supplied to said instrument for measurement purposes, a signaling and energizing circuit for said electrically operated regulator, and contacts closed by the measurement deflection of said instrument at a selected deflection in response to a reduction in the average measurement heating current supplied to said instrument for energizing said signaling and regulator energizing circuit.

6. An electrical measuring instrument of the deflection type having an indicating pointer provided with a contact, a scale on which said pointer indicates the instrument measurement, a second contact adjustable in and along the path of movement of the pointer contact, a measurement circuit for energizing said instrument, a vibrator type relay including its armature, said armature serving as a switch in the instrument energizing circuit which switch is closed when the relay is deenergized, and an energizing circuit for said relay which is closed when said pointer contact engages said second contact, whereupon the instrument energizing circuit is opened and closed by the vibratory action of said vibratory relay.

7. An electrical measuring instrument of the deflection type, a pointer operated by said instrument, a scale on which said pointer indicates the instrument measurement, a switch including a part adjustable along said scale and a part carried by said pointer which when opposite each other close said switch, a source of alternating current supply, a measuring circuit for said instrument supplied from said source, a combined audible signal and autotransformer having a magnetic core, a pair of similar but reversely wound coils thereon and a magnetic vibratory armature adjacent said core, said reversely wound coils being included in series in the instrument measurement circuit, and a signaling circuit also energized from said source from a point between said two coils through said switch when closed, said autotransformer serving to modify the current in the instrument circuit and said armature serving to produce an audible signal only when said signaling circuit is energized.

STEPHEN C. HOARE.
ALMON J. CORSON.

REFERENCES CITED

The following references are of record in the file of this patent:

UNITED STATES PATENTS

| Number | Name | Date |
|---|---|---|
| 1,004,420 | Haagn | Sept. 26, 1911 |

FOREIGN PATENTS

| Number | Country | Date |
|---|---|---|
| 194,676 | Germany | Jan. 23, 1908 |
| 484,233 | Germany | Oct. 12, 1929 |
| 571,992 | Great Britain | Sept. 18, 1945 |